(12) United States Patent
Gao

(10) Patent No.: US 11,243,454 B2
(45) Date of Patent: Feb. 8, 2022

(54) AUTOMATIC FOCUS APPARATUS AND CAMERA MODULE WITH THE SAME

(71) Applicant: TRIPLE WIN TECHNOLOGY(SHENZHEN) CO. LTD., Shenzhen (CN)

(72) Inventor: Jun-Feng Gao, Shenzhen (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 0 days.

(21) Appl. No.: 16/886,012

(22) Filed: May 28, 2020

(65) Prior Publication Data

US 2021/0208483 A1     Jul. 8, 2021

(30) Foreign Application Priority Data

Jan. 7, 2020     (CN) .......................... 202010013489.1

(51) Int. Cl.
   *G03B 13/36*     (2021.01)
   *H04N 5/225*     (2006.01)
   *H04N 5/232*     (2006.01)
   *H04R 9/04*      (2006.01)

(52) U.S. Cl.
   CPC .......... *G03B 13/36* (2013.01); *H04N 5/2254* (2013.01); *H04N 5/2257* (2013.01); *H04N 5/23212* (2013.01); *H04R 9/046* (2013.01)

(58) Field of Classification Search
   CPC .. G03B 13/36; H04N 5/2254; H04N 5/23212; H04N 5/2257; H04R 9/046
   See application file for complete search history.

(56) References Cited

U.S. PATENT DOCUMENTS

| 2012/0293673 | A1  | 11/2012 | Wu et al. |
| 2018/0095341 | A1  | 4/2018  | Lee et al. |
| 2018/0164537 | A1* | 6/2018  | Lee ...................... H04N 5/2254 |
| 2018/0338069 | A1* | 11/2018 | Hu ........................ H04N 5/2252 |
| 2020/0304694 | A1* | 9/2020  | Kim ......................... G02B 7/08 |

FOREIGN PATENT DOCUMENTS

| CN | 208044173 U | 11/2018 |
| TW | 201248294 A | 12/2012 |

* cited by examiner

*Primary Examiner* — Padma Haliyur
(74) *Attorney, Agent, or Firm* — ScienBiziP, P.C.

(57) ABSTRACT

An automatic focus apparatus for a camera module includes a voice coil motor and a driving unit. The voice coil motor includes a frame, a moving member with a lens, and a magnetic member. The magnetic member is positioned at a side wall of the moving member, the driving unit is positioned at a side plate of the frame. A magnetic field is generated by the driving unit and the magnetic member, the magnetic field drives the moving member with the lens to move, to achieve automatic focus.

9 Claims, 3 Drawing Sheets

AUTOMATIC FOCUS APPARATUS AND CAMERA MODULE WITH THE SAME

FIELD

The subject matter herein generally relates to image-capturing.

BACKGROUND

Current mobile phones with a full screen require that a front camera module has a smaller size. The camera module generally includes a lens, a driving unit, and a voice coil motor (VCM). The driving unit is separated from the VCM and positioned outside the camera module. The driving unit is electrically connected to the VCM to drive the lens to move.

The above described structure of the camera module causes the camera module to be large and thus is not conducive to a reduction of the overall volume. Furthermore, the driving unit being placed outside the camera module is susceptible to environmental impact and affects an assembly of the camera module.

Therefore, there is room for improvement within the art.

BRIEF DESCRIPTION OF THE DRAWINGS

Many aspects of the disclosure can be better understood with reference to the figures. The components in the figures are not necessarily drawn to scale, the emphasis instead being placed upon clearly illustrating the principles of the disclosure.

DETAILED DESCRIPTION

Figure 1:
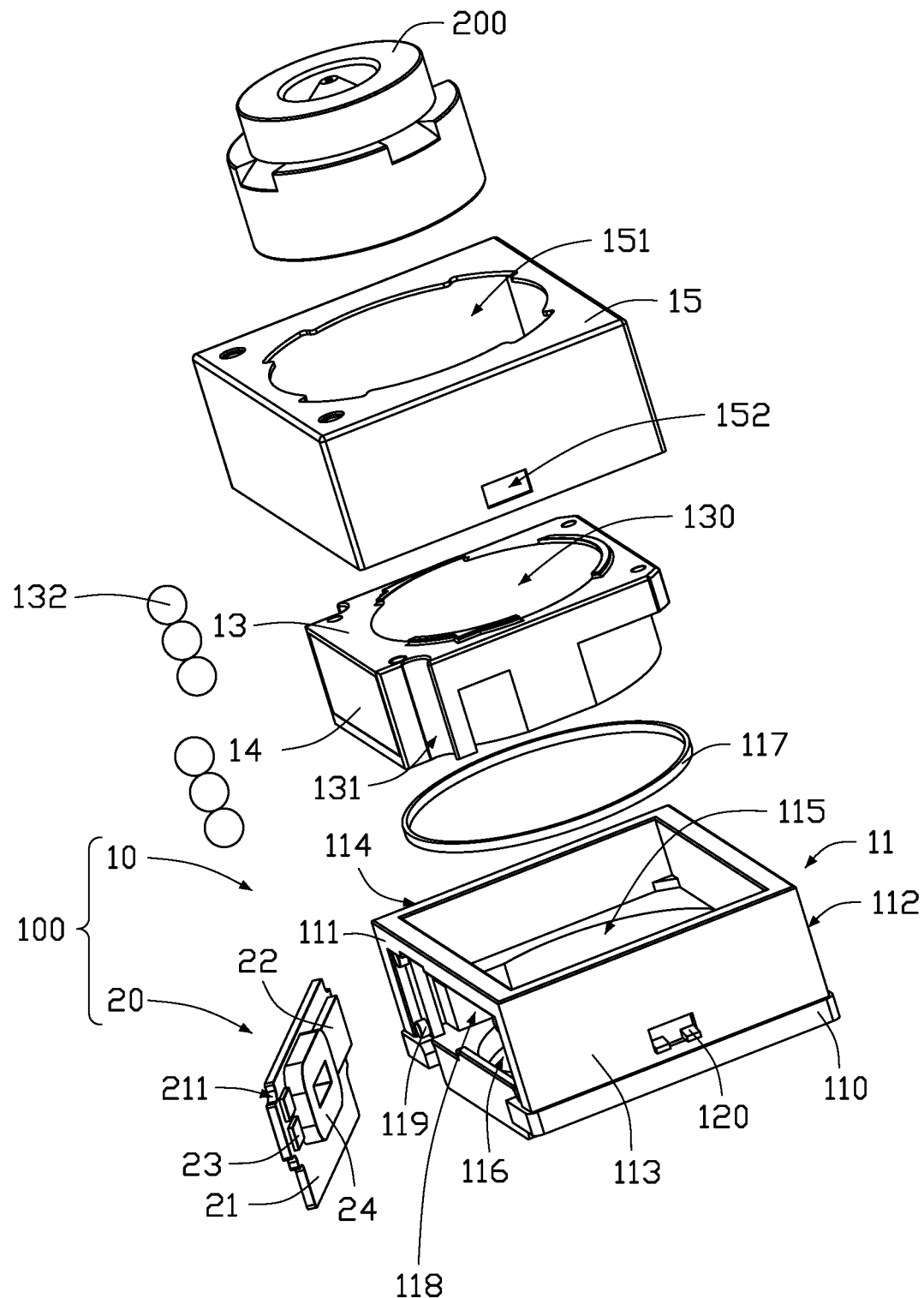
FIG. 1 is an exploded, isometric view of a camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a camera module 300 according to an embodiment of the present disclosure. The camera module 300 includes an automatic focus (AF) apparatus 100 and a lens 200. The camera module 300 can adjust a location of the lens 200 through the AF apparatus 100, thereby the lens 200 can take a clear image.

The AF apparatus 100 includes a voice coil motor (VCM) 10 and a driving unit 20. In this embodiment, the VCM 10 forms an open loop motor and includes a frame 11, a moving member 13, a magnetic member 14, and a housing 15. The moving member 13 is received in the frame 11. The magnetic member 14 is positioned at a side wall of the moving member 13 and corresponds to the driving unit 20. The housing 15 wraps around an outside of the frame 11. The lens 200 is received in the moving member 13 and partially exposed from the housing 15.

In this embodiment, the frame 11 is substantially rectangular. The frame 11 includes a bottom plate 110 and at least one side plate. In this embodiment, the frame 11 includes a first side plate 111, a second side plate 112, a third side plate 113, and a fourth side plate 114. The bottom plate 110 is substantially rectangular and configured to support the first to fourth side plates 111-114. The first side plate 111 and the second side plate 112 are positioned parallel with each other. The third side plate 113 and the fourth side plate 114 are positioned parallel with each other. Each of the third side plate 113 and the fourth side plate 114 is perpendicularly connected to an end of the first side plate 111 and an end of the second side plate 112. The first to fourth side plates 111-114 are all perpendicularly positioned at a periphery of the bottom plate 110. The first to fourth side plates 111-114 and the bottom plate 110 cooperatively form a first receiving space 115.

In this embodiment, the bottom plate 110 defines a receiving slot 116. The receiving slot 116 is configured to receive a protecting pad 117. The protecting pad 117 is substantially in the form of a circular ring. A size of the protecting pad 117 is corresponding to the receiving slot 116. The protecting pad 117 is used to prevent the moving member 13 from directly contacting the bottom plate 110, that is, the moving member 13 is isolated from the bottom plate 110 through the protecting pad 117.

In this embodiment, one of the first to fourth side plates 111-114 defines an opening 118. In detail, the opening 118 is defined at the first side plate 111. The first side plate 111 further forms at least one blocking portion 119. In one embodiment, the first side plate 111 forms four blocking portions 119. The four blocking portions 119 are positioned at four corners of the first side plate 111 adjacent to the opening 118.

In one embodiment, one of the first to fourth side plates 111-114 further forms a clamping portion 120. In this embodiment, the clamping portion 120 is positioned at the third side plate 113.

The moving member 13 is accommodated in the first receiving space 115 and resists the protecting pad 117. The protecting pad 117 is used to prevent the moving member 13 from directly contacting the bottom plate 110 and reduce the friction when moving. In one embodiment, the moving member 13 defines a second receiving space 130. In this embodiment, the second receiving space 130 is defined at a middle location of the moving member 13 and configured to receive the lens 200. When the lens 200 is received in the second receiving space 130, the lens 200 moves together with the moving member 13. The lens 200 can be moved to a preset location to achieve precise focusing.

The magnetic member 14 is positioned at a side wall of the moving member 13 and corresponds to the first side plate 111. In this embodiment, when the magnetic member 14 moves, the moving member 13 is driven to move.

In one embodiment, the moving member 13 further forms at least one sliding groove 131. In this embodiment, the moving member 13 forms two sliding grooves 131. The two sliding grooves 131 are defined at ends of a side wall of the moving member 13 where the magnetic member 14 is positioned. The side wall of the moving member 13 defining the two sliding grooves 131 corresponds to or faces towards the first side plate 111. Each of the two sliding grooves 131 is configured to receive a ball 132. When the magnetic member 14 moves, the moving member 13 is moved. The balls 132 in the two sliding grooves 131 interlock with the moving member 13 to reduce a friction of movement.

In this embodiment, a shape and a structure of the housing 15 are matched with the frame 11. The housing 15 is substantially a rectangular frame with one end open. By aligning the open end of the housing 15 with the frame 11, the housing 15 covers the moving member 13 and the frame 11. In one embodiment, the housing 15 defines a receiving hole 151 on one side of the housing 15 away from the open end. When the lens 200 is installed in the second receiving space 130, the lens 200 is partially exposed from the receiving hole 151.

In this embodiment, one side of the housing 15 further defines a clamping hole 152. The clamping hole 152 corresponds to the clamping portion 120. When the housing 15 covers the frame 11, the housing 15 is installed on the frame 11 by snapping the clamping portion 120 into the clamping hole 152.

In this embodiment, the driving unit 20 includes a circuit board 21, a storage unit 22, a driving chip 23, and a coil 24. The circuit board 21 may be a printed circuit board (PCB). The circuit board 21 is positioned at the opening 118 of the first side plate 111. In one embodiment, the circuit board 21 defines at least one notch 211. The at least one notch 211 corresponds to the at least one blocking portion 119. For example, the circuit board 21 defines four notches 211. The four notches 211 are defined at four corners of the circuit board 21. By aligning the four notches 211 of the circuit board 21 to the four blocking portions 119 and snapping the four blocking portions 119 into the four notches 211, the circuit board 21 is mounted on the first side plate 111 of the frame 11.

The storage unit 22, the driving chip 23, and the coil 24 are all integrated on the circuit board 21. The driving chip 23 is electrically connected to the storage unit 22 and the coil 24. The storage unit 22 may be, but is not limited to, an electrically erasable programmable read only memory (EEPROM). The driving chip 23 is used to provide power to the coil 24 and generate a magnetic field in the coil 24, thereby driving the magnetic member 14 to move. For example, when the coil 24 is energized, a magnetic force is generated between the coil 24 and the magnetic member 14. The magnetic force drives the magnetic member 14 to move relative to the frame 11, for example, the magnetic member 14 can be moved up or down relative to the frame 11. Since the magnetic member 14 is positioned on the moving member 13, the magnetic member 14 drives the moving member 13 and the lens 200 to move relative to the frame 11, thereby adjusting a focus of the lens 200.

Figure 2:
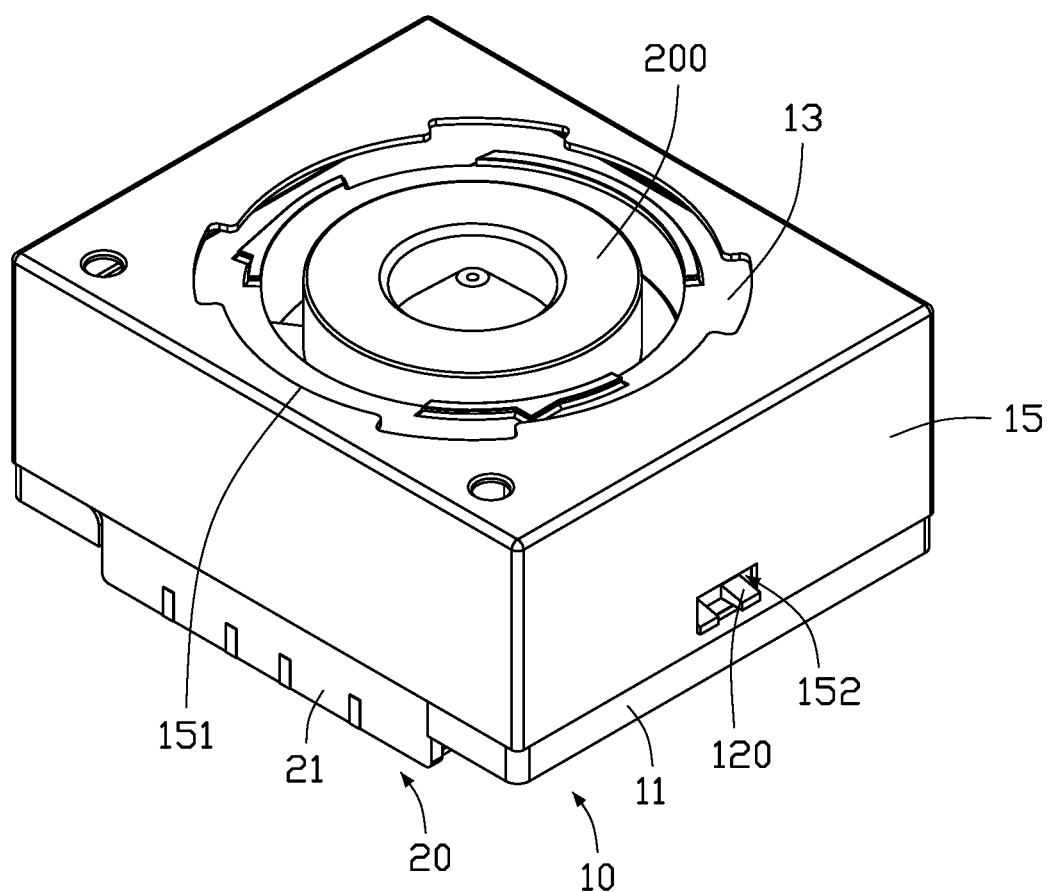
FIG. 2 is an assembled, isometric view of the camera module of FIG. 1.

As illustrated in FIG. 2, in this embodiment, when assembling the camera module 300, the circuit board 21 is firstly positioned on the side wall of the frame 11 in the above-mentioned manner. Next, the moving member 13 having the magnetic member 14 is accommodated in the first receiving space 115 and resists the protecting pad 117. The lens 200 is accommodated in the second receiving space 130 of the moving member 13. Finally, the housing 15 is mounted on the frame 11 and covers the lens 200 and the moving member 13, and the lens 200 is partially exposed from the receiving hole 151.

Figure 3:
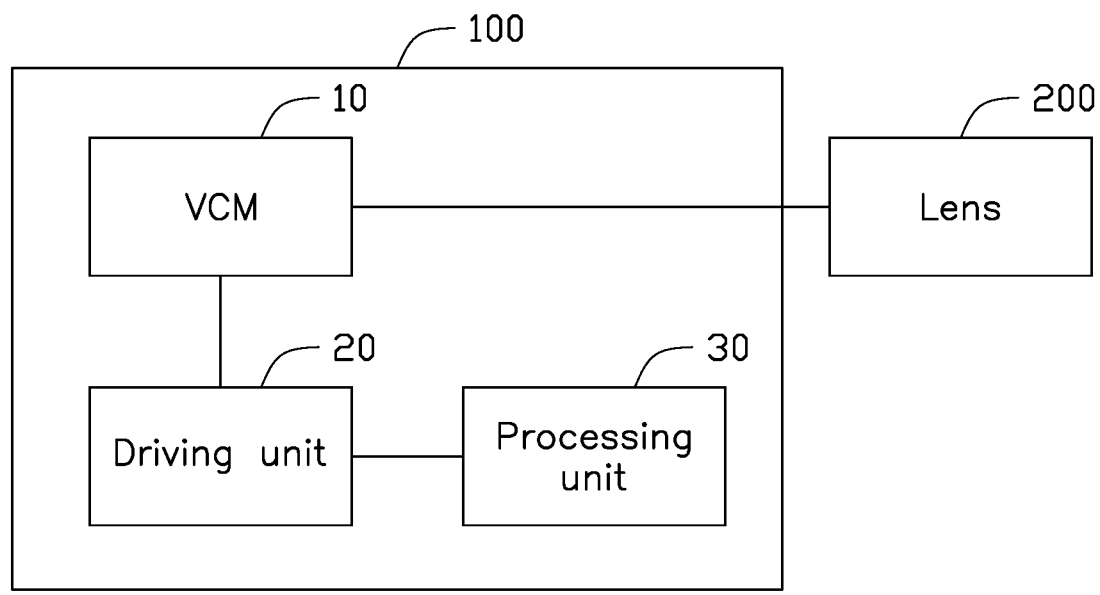
FIG. 3 is a block diagram of the camera module of FIG. 2.

As illustrated in FIG. 3, the AF apparatus 100 further includes a processing unit 30. The processing unit 30 can be an image signal processor (ISP), a digital signal processor (DSP), or other processor. The processing unit 30 is electrically connected to the driving unit 20.

When the camera module 300 operates in an AF mode, the driving unit 20 outputs a driving current from between zero to a maximum value. Then, the lens 200 can be driven by the driving unit 20 to move from an original position to a maximum displacement. At this time, the lens 200 automatically takes and saves pictures by the processing unit 30. The processing unit 30 then calculates a modulation transfer function (MTF) value of each of the pictures to form an MTF curve and finds a maximum MTF value in the MTF curve through an algorithm. The processing unit 30 further obtains a current value corresponding to the maximum MTF value and instructs the driving unit 20 to provide that current (that is, the current value corresponding to the maximum MTF value) to the VCM 10, so that the lens 200 is stable on that imaging plane and an automatic zoom is achieved.

In this embodiment, the driving unit 20 is disposed on the side wall of the frame 11. A size of the camera module 300 is approximately 8.5*7.0 MM. Compared with a size of a conventional camera module, for example, 8.5*8.5 MM, the overall size of the camera module 300 is reduced by 1.5 mm, thereby reducing the overall size of the camera module 300.

In this embodiment, the balls 132 serve to allow smooth movements when the moving member 13 moves relative to the frame 11. In this way, when the moving member 13 drives the lens 200 to move, a friction force between the moving member 13 and the frame 11 is reduced, so that a moving distance is more accurate and long-term repeatability is enhanced.

In this embodiment, the camera module 300 can be applicable to, but is not limited to, a front camera and/or a rear camera of an electronic device (not shown). The electronic device can be a mobile phone, a tablet computer, a netbook, a computer, a smart wearable device, a monitoring equipment, a vehicle equipment, or other electronic device.

The camera module 300 has a simple structure. An overall volume of the camera module 300 is reduced. The camera module 300 is provided with balls 132 instead of springs, thus eliminating gradations of driving current needed to overcome spring tension, power consumption is also lowered. Additionally, the camera module 300 reduces the number of magnetic members 14 and does not include a spring. Thus, unnecessary damping effect of the spring is completely eliminated, the focusing accuracy of the camera module 300 is improved and a focusing speed is faster.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. An automatic focus apparatus comprising:
   a voice coil motor comprising:
      a frame;

a moving member received in the frame and configured to receive a lens; and a magnetic member positioned at a side wall of the moving member; and a driving unit positioned at a side plate of the frame and corresponding to the magnetic member;

wherein the driving unit and the magnetic member generate a magnetic field, the magnetic field drives the moving member and the lens to move; and wherein the frame comprises four side plates, one of the four side plates defines an opening, the driving unit comprises a circuit board, the side plate of the frame defining the opening forms at least one blocking portion, the circuit board defines at least one notch corresponding to the at least one blocking portion, the circuit board is mounted on the side plate of the frame defining the opening through snapping the at least one blocking portion into the at least one notch.

2. The automatic focus apparatus of claim 1, wherein the frame comprises a bottom plate and at least one side plate, the at least one side plate is perpendicularly positioned at a periphery of the bottom plate, the bottom plate and the at least one side plate cooperatively form a first receiving space, the moving member is received in the first receiving space.

3. The automatic focus apparatus of claim 2, wherein the driving unit is positioned at the opening.

4. The automatic focus apparatus of claim 1, wherein the driving unit further comprises a driving chip and a coil, the driving chip and the coil are positioned at the circuit board, the driving chip is electrically connected to the coil and provides a driving current to the coil, when the coil is energized, the magnetic field is generated between the coil and the magnetic member and drives the magnetic member to move relative to the frame.

5. The automatic focus apparatus of claim 4, wherein the side wall of the moving member where the magnetic member is positioned defines at least one sliding groove, the at least one sliding groove is configured to receive a ball, when the moving member moves relative to the frame, the ball interlocks with the moving member to reduce a friction of movement.

6. The automatic focus apparatus of claim 1, wherein the moving member further defines a second receiving space, the second receiving space is configured to receive the lens.

7. The automatic focus apparatus of claim 1, further comprising a housing, wherein the housing is mounted on the moving member and the frame.

8. The automatic focus apparatus of claim 7, wherein the housing defines a receiving hole, the receiving hole is configured to make the lens be partially exposed from the receiving hole.

9. The automatic focus apparatus of claim 7, wherein the frame comprises a clamping portion, the housing defines a clamping hole, the housing is mounted on the frame by snapping the clamping portion into the clamping hole.

* * * * *